United States Patent

[11] 3,610,917

| [72] | Inventor | John D. Hunt |
| | | 6186 Sandbury Drive, Dayton, Ohio 45424 |
| [21] | Appl. No. | 731,041 |
| [22] | Filed | May 22, 1968 |
| [45] | Patented | Oct. 5, 1971 |

[54] LIGHTING FIXTURE
3 Claims, 6 Drawing Figs.

[52] U.S. Cl............................................. 240/10 P, 240/8.3
[51] Int. Cl......................................... B60g 1/26
[50] Field of Search........................... 240/10, 8.3, 10 P

[56] References Cited
UNITED STATES PATENTS

| 66,539 | 2/1925 | Hudlow | 240/10 X |
| 1,707,003 | 3/1929 | Geyser | 240/8.3 |
| 1,738,770 | 12/1929 | Geyser | 240/8.3 |
| 1,905,182 | 4/1933 | Mead | 240/8.3 |
| 2,758,198 | 8/1956 | Kronhaus | 240/10 X |
| 3,248,531 | 4/1966 | Dover | 240/8.3 |
| 3,458,849 | 7/1969 | Marks | 240/8.3 X |
| 3,067,974 | 12/1962 | Baldwin | 240/8.3 X |

FOREIGN PATENTS

| 1,111,568 | 5/1968 | Great Britain | 240/10 P |

Primary Examiner—Samuel S. Matthews
Assistant Examiner—Russell E. Adams, Jr.
Attorney—Jerome P Bloom ABSTRACT: A lighting fixture particularly adaptable for use as a rear light on automotive vehicles. The fixture has a mount serving as a closure for a normal lens opening. In connection with the mount and spaced therefrom is a relatively projected, hollow, ornamental lens body, illuminated from within.

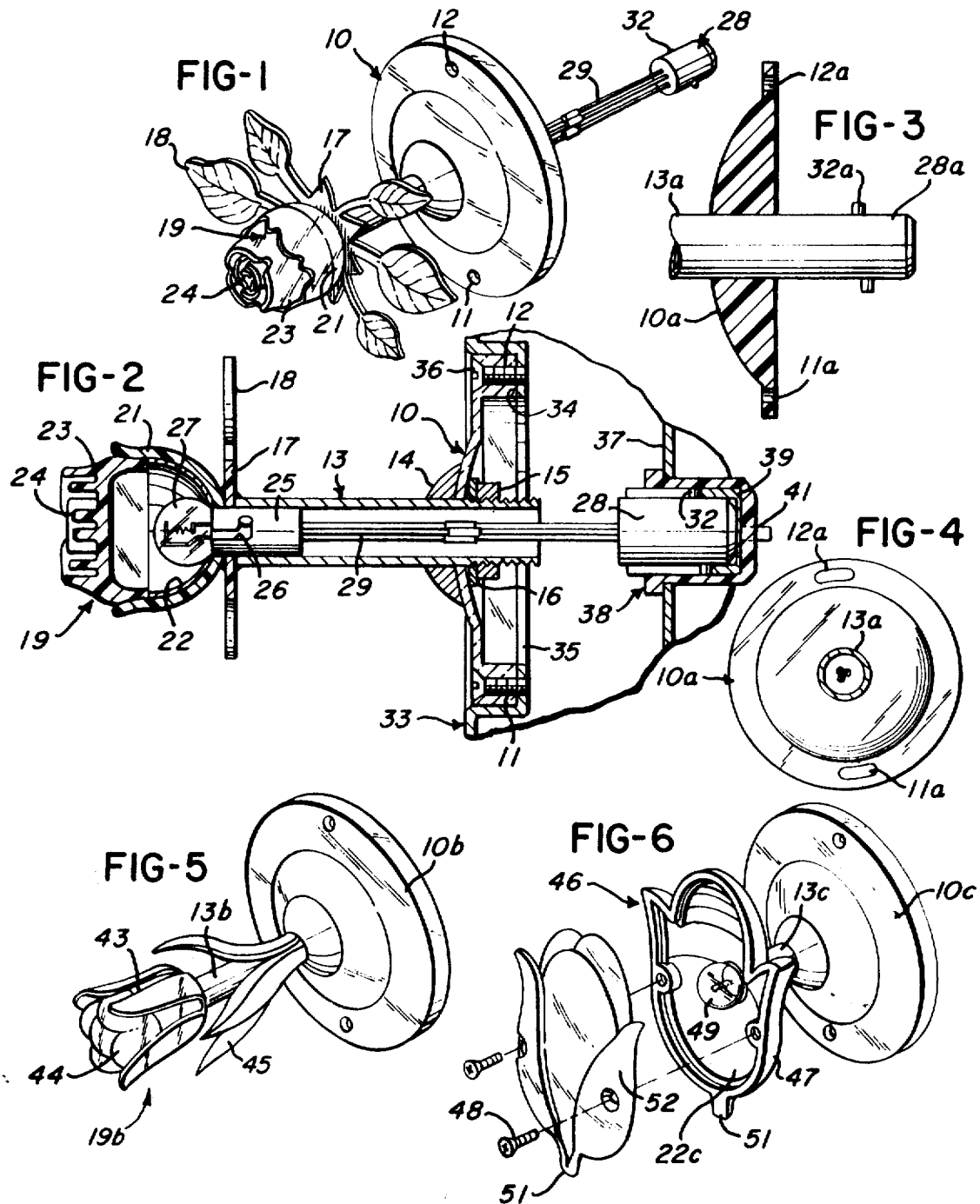

LIGHTING FIXTURE

This invention relates to an ornamental light device having a particularly advantageous though not limited application to automotive and like vehicles.

Many automobile owners seek custom accessories to lend their cars a more distinctive appearance. Such accessories are in great demand and have a great variety of shape, application and form. Some have utilitarian purposes and are functional as well as ornamental. The present invention devices are of this character. They afford a unique, ornamental and purposeful addition to an automotive vehicle and will be so described.

In the invention embodiments here illustrated they are utilized as custom accessories replacing a conventional rear tail, brake or turn indicator light.

The fixture is completely integrated into the vehicle lighting system and could be supplied, therefore, as original equipment. Its nature is such it may be readily coupled to the vehicle body to provide an illuminated relatively projected lens. The character of the device is such to provide a beacon light offering distinctive visibility, both from the side and the rear. Since the light, as here provided is projected, it is readily and more easily distinguishable from other lights on the vehicle to which it is applied. A lens of an ornamental character is thus provided which is enhanced by illumination and so designed as to be extremely useful in drawing the attention of following drivers.

In its illustrated embodiment a lighting fixture in accordance with the invention includes an adapter to mount in and close a conventional lens opening in a vehicle. Tubular means extend normally from the adapter to place the outer end thereof in a projected relation, both to the lens opening and the body panel of which the lens opening is a part. A lamp socket device is installed in the outer end of the tubular means to include electrical connectors which extend rearwardly for conventional application in the usual lamp receptacle which is recessed relative to the lens opening in the vehicle body. The outer end of the tubular means mounts a hollow utilitarian ornamental lens assembly, which contains a lamp in the aforementioned socket and is thus lighted, from within. It is preferred that the lens assembly be made to resemble a flower, leaf forms radiating from the base thereof to provide a suitable setting or background to enhance projected light.

A primary object of the invention is to provide a lighting fixture which is particularly advantageous in application to automotive vehicles and which is economical to fabricate, most efficient and satisfactory in use and adaptable to a wide variety of applications.

Another object of the invention is to provide a generally new ornamental lighting fixture having particular though not limited utility for application to automotive vehicles.

An additional object of the invention is to provide an ornamental device having a particularly advantageous application to automotive vehicles.

Another object of the invention is to provide a lighting fixture of distinctive ornamental character which may serve to house a tail, brake or turn indicator light on an automotive vehicle and add distinction and increased advantage to its lighting system.

A further object of the invention is to provide a lighting fixture which may be quickly and easily applied to automotive vehicles having conventional lighting systems.

Another object of the invention is to provide a lighting fixture possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein some but not the only form of embodiment of the invention are illustrated, FIG. 1 is a perspective view of a lighting fixture in accordance with the invention;

FIG. 2 is a fragmentary view, in longitudinal section, of the lighting fixture shown in FIG. 1 as installed in the rear of an automotive vehicle;

FIG. 3 is a fragmentary view of a modification of the invention, a plan view being shown in FIG. 4;

FIG. 5 is a perspective view of a lighting fixture presenting an alternate form of ornamental lens assembly, electrical connectors and attached plug being omitted; and FIG. 6 is a view similar to FIG. 5 showing still another form of ornamental lens assembly in accordance with the invention, the assembly in this instance being shown exploded into component parts.

Like parts are indicated by similar characters of reference throughout the several views.

Referring to the drawings, the lighting fixture there illustrated reveals a radial flange 10 having a relatively thickened outer periphery in which are formed diametrally positioned apertures 11 and 12. The flange 10 is centrally apertured to accommodate the slip fit projection therethrough of a tubular body member 13. An annular member 14 formed integral with or otherwise secured to the exterior of the tubular member 13 provides a limit on the member 13 in a direction outwardly of the flange 10. It is to be noted that the central portion of the flange 10 which abuts the member 14 is outwardly convex and the surface of the member 14 which it abuts is of a complementary configuration.

The end of the member 13 which projects inwardly of the flange in a direction away from the annular member 14 has an external thread engaged by a nut 15 which secures a washer 16 in a seated relation to the inner concave surface portion of the flange 10. In this manner a fixed relation is positively established between the tubular member 13 and its peripherally projected mounting flange 10.

A plate 17 is secured at the outer end of the tubular member 13, perpendicular to its longitudinal axis. The plate 17 may be fixed in position by any suitable means, such as cement. It is to be noted that individual leaf forms 18 are formed integral with and to radiate outwardly from the plate 17.

The tulip-shaped base cup 21 of a hollow lens assembly 19 is likewise secured by suitable bonding techniques to the forward end of the tubular member 13 and to the transversely disposed plate 17 so as to form an integral part thereof. The inner base portion of cup 21 is lined with a shallower conforming reflector 22. The lens assembly further includes a bowed out lens element 23 which is cupped reversely of bore cup 21 and frictionally nests in place within the outer open end of the cup portion 21 to have its rim portion abut the shoulder defined by the forward end of the reflector 22.

The outermost face of the lens element 23 is formed with discontinuous arcuate projections 24 which have a scalloped configuration. As nested in the outer divergent extremity of the base cup portion 21, this achieves the form of a flower. In the instance of the example shown in FIGS. 1 and 2, the flower represents a simulation of a rose.

Nested in fixed relation to the outer end of the tubular member 13 is a socket 25 which projects through aligned apertures in the center of the plate 17, the base of the cup 21 and its liner 22. Conventional bayonet slots 26 open from the wall of the socket 25 to the interior of the reflector 22. These slots accommodate the radially projected pins on the base of a lamp bulb 27 which is thereby conventionally interlocked with the socket 25 and the tubular member 13.

Fixed to extend rearwardly from the socket 25 are electrical leads 29. The latter are projected through the tubular member 13 to mount on their terminal extremities a plug 28 having diametrically opposed longitudinally offset radially projected pins 32. Take note that the leads 29 may be in segments and interconnected midway of their length by coupling devices.

In the example illustrated the above-described lighting fixture is mounted in an exterior body panel 33 to the rear of an automotive vehicle. As indicated in fragmentary form in FIG.

2, the panel 33 conventionally includes a depression 34, the base of the peripheral wall of which is rimmed by a flange defining an opening 35. The latter opens to a relatively recessed wall portion 37 of the vehicle body which incorporates a cup-shaped lamp receiving socket member 38. The member 38 includes a cup made of insulating material lined by an electrically conductive mating insert 39 from which conductors extend for connection to the vehicle power supply system. Here the extension is represented schematically by the numeral 41.

It should be noted that the thickened portions of the outer periphery of the flange 10 are of a depth corresponding to the recess of the flange which defines the opening 35. This latter flange has threaded apertures which align with the apertures 11 and 12 in the flange 10. The aligned apertures accommodate the projection therethrough of screws 36 which easily secure the flange portions together.

It should be further noted that the plug 28 is interlockingly received in the receptacle in the panel 37 to have its projected pins engage in bayonet slots in the electrically conductive insert 39. A circuit is thus established to provide for lighting the bulb 27 through conventional means under the control of the driver of the automotive vehicle.

Accordingly, the lighting fixture is rigidly mounted to the vehicle body. By virtue of its mounting on the tubular member 13 the hollow lens assembly 19 projects a significant distance from the vehicle body as represented by the mounting panel 33, to its rear. As the lamp 27 is energized by a signal transmitted by the driver through the vehicle power system, the light is projected therefrom both axially in a natural direct flow, and by reflection, through the medium of the liner 22. The material of the elements 21, 23 and 24 of the lens assembly 19 is preferably translucent so the reverse orientation of the element 23 and the surrounding peripherally projected extremity of the element 21 afford means for the lateral dispersement of light while the axially projected light rays are diffused about and through the denser portions 24. It will be seen therefore that there is a glow of a distinctive, widely dispersed nature projected and displaced from the rear of the vehicle. This glow will assume a flowerlike pattern enhanced against the dark background of the leafs 18 and the plate 17. The distinctiveness and the eye attracting character of light so diffused will afford a definite attraction for the eye of a following driver, lending safety in that this driver will then maintain a safe distance and awareness of the vehicle which mounts the invention fixture. We thus achieve utility as well as significant ornamentation.

To summarize, in accordance with the described concept of its use, the lighting fixture, as a custom accessory, may be substituted for the existing tail or signal lights of an automotive vehicle. As represented in FIGS. 1 and 2 of the drawings, the body panel depression 34 including opening 35 represents the customary or usual lens opening provided in the vehicle body and the panel 37 to the rear thereof mounts the conventional lamp receptacle 38–39 also as normally provided.

The flange portion 10 of the light fixture here described is given, as illustrated, a configuration at its periphery to substantially agree with the peripheral configuration of a normally encountered lens. This facilitates the installation of the invention fixture as a replacement in any given vehicle In the case of the invention it is not necessary that the flange 10 be transparent or translucent, though it has been so illustrated.

In FIGS. 1 and 2 the flange 10 has been shown as a separable portion of the invention light fixture. This is to facilitate its replacement in the event of breakage or in the event a flange of different peripheral configuration need be substituted for a particular application. However, the flange portion 10 may be formed integral with the tubular member 13 for some applications, in which event the elements 14, 15 and 16 could be dispensed with. In such case the inner end of the member 13 need not be threaded.

A further modification of the invention is shown in FIG. 3. There is here illustrated an alternate form of the member 13 and its mounting flange. In this instance the tubular member is designated as 13a and shown, by a fragmentary representation, to be axially extended and so modified as to per se incorporate a connector plug 28a at its inner extremity. In this instance, the inner extremity mounts in diametrically positioned, longitudinally offset, and radially projected relation connector pins 32a which correspond to the pins 32 in FIGS. 1 and 2. It will be understood that the member 13a is here provided with suitable electrical connection from the sleeve 25 to the pins 32a. A further modification in this instance is that flange 10a corresponding to the flange 10 is connected integrally to the body of the tubular member 13a. Since in this instance the mounting flange 10a will be formed integral with the tubular member 13a its apertures 11a and 12a will be circumferentially extended slots as shown in FIG. 4. This is to accommodate the single rotative turn the entire light fixture assembly requires for application thereof to the conventional socket 38–39.

The form of embodiment of FIGS. 3 and 4 eliminates the need for the elements 14 through 16 and the threading, as will be obvious.

In FIGS. 1 and 2 the lens assembly 19 is shown in the configuration of a rose the elements of which are transversely split and relatively nested on assembly. Also, here the plate 17 and leaf forms 18 are transverse to the base of the lens assembly to provide a planar setting or background.

It will be realized that from an ornamental standpoint other flower forms and environmental background of the hollow lens assembly are possible in applying the teachings of the invention. For example, FIG. 5 illustrates a tubular member 13b corresponding to the member 13 having a radial mounting flange 10b and a lens assembly 19b in the form of a tulip. Here longitudinally projected leaves 45 which may or may not be translucent extend from the internal rim of the flange 10b and about the tubular member 13b to assume a rimming nesting relation to the tulip configuration of the lens assembly 19b. In this case, the tulip cup portion 43 corresponds to the element 21 in FIG. 2 and the nesting bud portion 44 corresponds to the element 23. The difference here provided is the change in definition of the pattern of the emitted translucent light, as distinguished from the pattern afforded in the structure of the nose of FIG. 2.

FIG. 6 of the drawings illustrates a modification of the tulip configuration as shown in FIG. 5. Here the tubular member is designated as 13c and the tulip is oriented at right angles to the position illustrated in FIG. 5. As seen in FIG. 6, the cup portion of the lens assembly is provided by one-half the flower 46 which is transversely oriented, the other half serving as the outer portion of the lens assembly. The base portion 47 will contain the reflector 22c about the contained lamp 49 and when the two halves of the flowers are brought together they may be connected by screws 48 as illustrated. In this case, stem portions 51 will extend from the bottom of a compound flower oriented at right angles to the tubular member 13c. From the stem portions 51 will extend the formed leafs 52 outlining the flower lens assembly. By disposing the tulip configuration in this orientation, there is a potentially greater amount of axially projected light and a flatter dissipation of laterally projected light.

It will thus be seen that the invention contemplates a simple, unique and ornamental concept of a custom accessory which on application to automotive and like vehicles lends significant safety features as described. The distinctiveness of a transmitted light and the nature of its framing and dispersal will in all instances induce following drivers to maintain a safe distance and to readily recognize the intent of the movements of the driver which utilizes the invention embodiments.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

I claim:

1. A lighting fixture for use as a tail or other signal light in a vehicle comprising:
   A. An adapter plate seatable in and bridging a signal lens opening of said vehicle and attachable to said vehicle,
   B. a tube mounted in and projecting generally normal to said adapter plate and outwardly therefrom,
   C. and ornamental lens assembly mounted at the outer end of said tube, said assembly including; a cupped portion having a base attached to the outer end of said tube, a translucent rim portion substantially concentric with the axis defined by the tube, a cupped reflector mounted within and conforming to said cupped portion and adjacent to said base, said rim extending beyond said cupped reflector, and a lens comprised of a cupped element having a lens rim generally coincident with an frictionally nested within said rim portion, and an intermediate portion generally transverse to the axis defined by said tube.
   D. A lamp socket mounted at the outer end of said tube and extending through said base,
   E. electrical conductor means disposed within the outer surface of said tube, operatively connected to said lamp socket and extending to the inner end of said tube, and
   F. electrical plug means operatively connected to said conductor means and shaped to be inserted in a signal light socket normally disposed within said signal lens opening.

2. A lighting fixture according to claim 1 where said intermediate portion has a light-directing surface which is substantially perpendicular to the axis defined by said tube.

3. A lighting fixture according to claim 1 where said electrical plug means is formed integral with the inner end of said tube.